United States Patent
Lees et al.

(10) Patent No.: US 10,978,123 B2
(45) Date of Patent: Apr. 13, 2021

(54) TAMPER PROTECTION OF MEMORY DEVICES ON AN INTEGRATED CIRCUIT

(71) Applicant: NXP USA, INC., Austin, TX (US)

(72) Inventors: Geoffrey Mark Lees, Austin, TX (US); Lawrence Loren Case, Austin, TX (US); Nihaar N. Mahatme, Austin, TX (US); Jeffrey C. Cunningham, Austin, TX (US)

(73) Assignee: NXP USA, Inc., Austin, TX (US)

( * ) Notice: Subject to any disclaimer, the term of this patent is extended or adjusted under 35 U.S.C. 154(b) by 198 days.

(21) Appl. No.: 16/209,090

(22) Filed: Dec. 4, 2018

(65) Prior Publication Data

US 2020/0176044 A1 Jun. 4, 2020

(51) Int. Cl.
*G06F 21/79* (2013.01)
*G11C 11/16* (2006.01)
*G06F 12/14* (2006.01)
*G11C 5/00* (2006.01)

(52) U.S. Cl.
CPC ...... *G11C 11/1695* (2013.01); *G06F 12/1408* (2013.01); *G06F 12/1491* (2013.01); *G06F 21/79* (2013.01); *G11C 5/005* (2013.01)

(58) Field of Classification Search
CPC .......... G06F 21/55; G06F 21/56; G06F 21/57; G06F 21/60; G06F 21/62; G06F 21/70; G06F 21/71; G06F 21/72; G06F 21/75; G06F 21/76; G06F 21/77; G06F 21/78; G06F 21/80; G06F 21/86; G06F 21/88; G06F 21/79
See application file for complete search history.

(56) References Cited

U.S. PATENT DOCUMENTS

| | | | |
|---|---|---|---|
| 7,343,496 B1 * | 3/2008 | Hsiang | G06F 21/572 713/194 |
| 7,797,553 B2 * | 9/2010 | Takagi | G06F 21/79 713/194 |
| 8,583,585 B2 | 11/2013 | Ghanadan et al. | |
| 8,909,942 B1 | 12/2014 | Obukhov et al. | |
| 9,575,903 B2 * | 2/2017 | Glew | G06F 21/602 |
| 9,910,742 B1 * | 3/2018 | Faibish | G06F 3/0685 |
| 2003/0005323 A1 * | 1/2003 | Hanley | G06F 21/78 713/194 |

(Continued)

FOREIGN PATENT DOCUMENTS

WO WO-2004/055824 A2 7/2004

OTHER PUBLICATIONS

AN44517—Design Recommendation for Battery-Backed SRAMs Using Cypress MoBL SRAMs; Cypress Semiconductor Application Notes; downloaded from Internet Nov. 29, 2018: http://www.cypress.com/documentation/application-notes/an44517-design-recommendation-battery-backed-srams-using-cypress.

(Continued)

*Primary Examiner* — Malcolm Cribbs

(57) ABSTRACT

A data system includes an information bus, a volatile memory located on the information bus, and an MRAM located on the information bus. The data system includes threat detection circuitry. In response to a threat condition to the MRAM, data is transferred via the information bus from the MRAM to the volatile memory for storage during a threat to the MRAM as indicated by the threat condition. In some examples, the threat condition is characterized as a magnetic field exposure.

20 Claims, 6 Drawing Sheets

(56) References Cited

U.S. PATENT DOCUMENTS

| | | | |
|---|---|---|---|
| 2005/0138110 A1* | 6/2005 | Redlich | G06F 21/6209 709/201 |
| 2006/0081497 A1* | 4/2006 | Knudsen | G11C 11/16 206/701 |
| 2006/0139069 A1* | 6/2006 | Frank | G06F 1/30 327/143 |
| 2006/0210076 A1* | 9/2006 | Knighton | H04N 1/00042 380/202 |
| 2006/0218439 A1* | 9/2006 | Carter-Schwendler | G06F 21/554 714/12 |
| 2009/0063797 A1* | 3/2009 | Taguchi | G06F 21/6218 711/162 |
| 2009/0106563 A1* | 4/2009 | Cherpantier | G06F 21/86 713/194 |
| 2010/0058077 A1* | 3/2010 | Matsuda | G06F 21/78 713/194 |
| 2012/0023589 A1* | 1/2012 | Walrath | H04W 12/12 726/26 |
| 2014/0108786 A1* | 4/2014 | Kreft | G06Q 20/3825 713/156 |
| 2014/0137271 A1* | 5/2014 | Hyde | G06F 12/0238 726/30 |
| 2014/0189865 A1* | 7/2014 | Abuelsaad | H04L 63/1408 726/23 |
| 2014/0230079 A1* | 8/2014 | Alam | G06F 3/0679 726/34 |
| 2015/0269396 A1* | 9/2015 | Grafton | G06F 21/70 726/2 |
| 2017/0010808 A1* | 1/2017 | Jacobs | G06F 3/0658 |
| 2017/0286682 A1 | 10/2017 | Stappert | |
| 2017/0357830 A1* | 12/2017 | Benson | H04L 9/0894 |
| 2017/0359366 A1 | 12/2017 | Bushey et al. | |
| 2018/0173580 A1* | 6/2018 | Pavlas | G06F 11/1441 |
| 2018/0307828 A1* | 10/2018 | Iyengar | G06F 21/52 |
| 2018/0341769 A1* | 11/2018 | Aoyama | G06F 21/552 |
| 2018/0373646 A1* | 12/2018 | Shwartz | G06F 21/52 |
| 2020/0019455 A1* | 1/2020 | Wolfson | G06F 21/577 |

OTHER PUBLICATIONS

Chakrapani, Anuj; Cypress Semiconductor Design Recommendation for Battery-Backed SRAMs Using Cypress moBL SRAMs; www.cypress.com; Document No. 001-44517 Rev. *H.

U.S. Appl. No. 16/047,077; Nihaar N. Mahatme, et al.; "Magnetic Attack Detection in a Magnetic Random Access Memory (MRAM);"; filed Jul. 27, 2018.

* cited by examiner

| L1 | L2 | L3 | Q0 | Q1 | THREAT CLASSIFICATION |
|----|----|----|----|----|----|
| 0 | 0 | 0 | 0 | 0 | NONE |
| 1 | 0 | 0 | 1 | 0 | IMMINENT |
| X | 1 | 0 | 0 | 1 | INEVITABLE |
| X | X | 1 | 1 | 1 | CATASTROPHIC |

FIG. 3   300

| STATE ID | Q0 | Q1 | MRAM | SRAM | TAMPER SOURCE | SITUATION |
|----|----|----|----|----|----|----|
| A | 0 | 0 | X | X | NONE | NONE |
| B | 0 | 1 | 0 | 0 | EXTERNAL | IMMINENT SYSTEM TAMPER |
| C | 0 | 1 | 0 | 1 | S=1 | IMMINENT SRAM TAMPER |
| D | 0 | 1 | 1 | 0 | M=1 | IMMINENT MRAM TAMPER |
| E | 0 | 1 | 1 | 1 | S=1 M=1 | IMMINENT BOTH SRAM AND MRAM |
| F | 1 | 0 | 0 | 0 | EXTERNAL | INEVITABLE SYSTEM TAMPER |
| G | 1 | 0 | 0 | 1 | S=1 | INEVITABLE SRAM TAMPER |
| H | 1 | 0 | 1 | 0 | M=1 | INEVITABLE MRAM TAMPER |
| I | 1 | 0 | 1 | 1 | S=1 M=1 | INEVITABLE BOTH SRAM AND MRAM |
| J | 1 | 1 | 0 | 0 | EXTERNAL | CATASTROPHIC SYSTEM TAMPER |
| K | 1 | 1 | 0 | 1 | S=1 | CATASTROPHIC SRAM TAMPER |
| L | 1 | 1 | 1 | 0 | M=1 | CATASTROPHIC MRAM TAMPER |
| M | 1 | 1 | 1 | 1 | S=1 M=1 | CATASTROPHIC BOTH SRAM AND MRAM |

TAMPER PROTECTION OF MEMORY DEVICES ON AN INTEGRATED CIRCUIT

BACKGROUND

Field

This disclosure relates generally to integrated circuits, and more specifically, to tamper protection of memory devices on an integrated circuit.

Related Art

Within a System on Chip (SoC), different types of memory devices may be used to store information, such as data and instructions. These memory devices may include volatile memories, such as Static Random Access Memory (SRAM), and non-volatile memories, such as flash memory or Magnetoresistive Random Access Memory (MRAM). Any of these memory devices may be susceptible to tampering due, for example, to multiple external stimuli. Tampering threatens the data availability, integrity, and secrecy of the information stored within any of the on chip memory devices. Therefore, a need exists to protect and secure on-chip data in response to such tampering.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in table form, multi-level threat indicators generated by the threat level detection circuit of FIG. 2 in response to a tamper sensor of the secure platform of FIG. 1, in accordance with one embodiment of the present invention.

FIG. 4 illustrates, in table form, various threat situations indicated by various values of the multi-level threat indicators and tamper source indicators, in accordance with one embodiment of the present invention.

DETAILED DESCRIPTION

In one aspect, an SoC includes both a host platform and a secure platform, in which the secure platform implements access protections, such as behind a firewall. Within this secure platform, SRAM or MRAM may be used to store critical information that is accessible by the host platform, in secure conditions. The secure platform needs to be protected from tampering from corruption. Therefore, within the secure platform, a threat handling circuit, in response to a tamper situation, can save and preserve the availability, integrity, and secrecy of the information stored within the secure platform. In one embodiment, tamper sensors, located at various locations of the SoC, are used to sense characteristics of the SoC, such as magnetic field exposure, extreme temperatures, or voltage levels. Each threat level detection circuit, in response to a corresponding tamper sensor, provides a tamper source indicator which may indicate a particular memory device of the SoC being threatened and a multi-level threat indicator which indicates the level of the threat. These multi-level threat indicators and tamper source indicators are then used to initiate various response and recovery actions, depending on the threat level and memory device being threatened, to protect the information which is at risk.

In one embodiment, the multi-level threat indicators differentiate among different levels of threat to the information stored in a memory associated with the sensor. These different levels of threat can include greater than 2 levels of threat, each with increasing threat severity. For example, these different levels may include no threat to the stored information, imminent threat to the stored information, inevitable threat to the stored information, and catastrophic threat to the stored information. Therefore, a multiple bit indicator may be output as the multi-level threat indicators from each threat level detection circuit.

Figure 1:
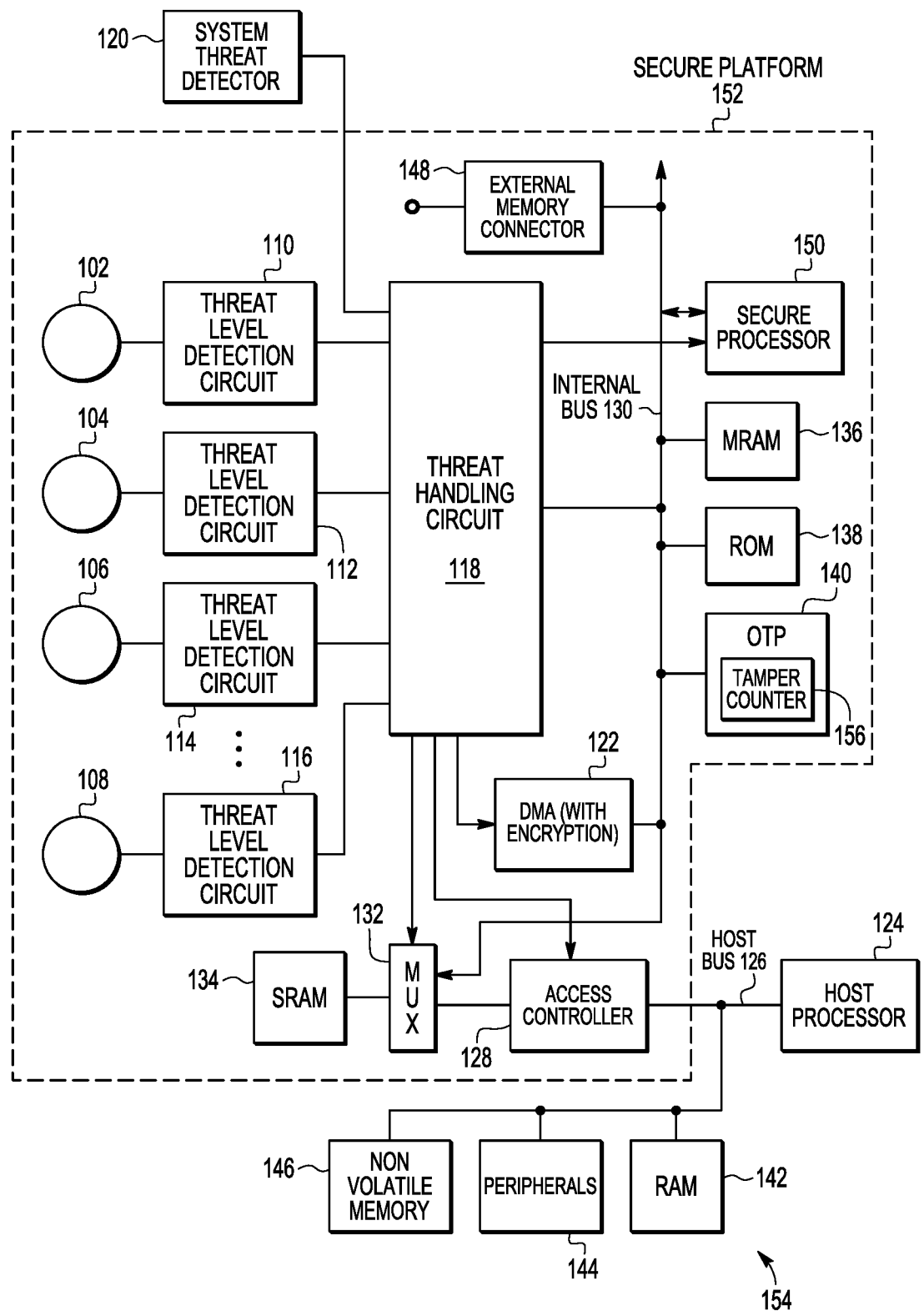
FIG. 1 illustrates, in block diagram form, a processing system having a host platform and a secure platform with a threat handling circuit, in accordance with one embodiment of the present invention.

FIG. 1 illustrates a data system 100 which includes a host platform 154 and a secure platform 152, in accordance with one embodiment of the present invention. Also, in one embodiment, system 100 is a located on a single chip, and thus may be referred to as an SoC. Host platform 154 includes a host processor 124 (which may be implemented as a host central processing unit (CPU)), a Random Access Memory (RAM) 142, one or more peripherals 144, and non-volatile memory 146, all bidirectionally coupled via a host bus 126 (which may be any type of bus or interconnect). Host processor 124 communicates with each of RAM 142, peripherals 144, and non-volatile memory 146 through host bus 126, as known in the art. Host platform may also include more or fewer components coupled to host bus 126. Host platform 154 is also coupled to secure platform 152 via access controller 128.

Secure platform 152 includes access controller 128, SRAM 134, and a selection circuit 132 (which is implemented as a multiplexor (MUX) in the illustrated embodiment, and thus referred to as MUX 132). MUX 132 either couples host processor 124 via access controller 128 to SRAM 134 or an internal bus 130 (internal to secure platform 152) to SRAM 134. Secure platform 152 includes a secure processor 150, an MRAM 136, a read only memory (ROM) 138, one-time programmable (OTP) memory 140, an external memory connector 148, a threat handling circuit (THC) 118, and a direct memory access (DMA) 122 all coupled to internal bus 130. Threat handling circuit 118 is also coupled to DMA 122, access controller 128, and to a select input of MUX 132. Secure platform 152 also includes N tamper sensors, sensor 1-N. These tamper sensors includes sensors 102, 104, 106, and 108. Each sensor is coupled to a corresponding threat level detection circuit, such as threat level detection circuits 110, 112, 114, and 116, in which threat level detection circuit 110 is coupled to an output of sensor 102, threat level detection circuit 112 is coupled to an output of sensor 104, threat level detection circuit 114 is coupled to an output of sensor 106, and threat level detection circuit 116 is coupled to an output of sensor 108. Each of the threat level detection circuits provide a multi-bit level indicator, determined from the corresponding sensor's output, to threat handling circuit 118. Threat handling circuit 118 may also receive system threat indicators from a system threat detector 120. Threat handling circuit 118 handles the received threat indicators by, for example, classifying, prioritizing, and responding to the threats, as needed. In doing so, threat handling circuit 118 controls DMA 122 to transfer data between memories within secure platform 152, controls MUX 132 to allow access controller 128 or internal bus 130 to access SRAM 134, and controls portions of secure processor 150 to transfer data between memories or to perform other operations.

In one embodiment, access controller 128 is a transaction monitor which denies, allows, partitions, or throttles access via host bus 126 to SRAM 134. The partitioning may be used, for example, to allow some part of SRAM 134 to be accessed by host platform 154 and another part by threat handling circuit 118. Access controller 128 provides a firewall to secure platform 152. MRAM 136 provides a fast write and low power non-volatile memory for secure data storage and data logging. DMA 132 moves and encrypts data from a vulnerable memory to a secure memory. Therefore, DMA 132 includes an encryption engine which can encrypt data using different encryption protocols. For example, one may be a normal encryption protocol, which is appropriate for multi-use, including both reading and writing to memory multiple times, and another may be an emergency encryption protocol which results in faster encryption but only appropriate for a single time use. OTP 140 can be a robust OTP or multiple-time programmable (MTP) memory in which catastrophic tamper events can be recorded and which may store versioning of firmware and configuration information. OTP 140 also includes a tamper counter 156 used to count tamper events when an attack is inevitable. In one embodiment, OTP 140 can be implemented with OTP or MTP MRAM. Note that OTP may be used sparingly for tamper events, such as when both SRAM and MRAM cannot be relied upon. Also, note that MRAM OTP, if available, is reliable even under conditions where the MRAM may not be. Tamper sensors 1-N may each be any type of sensor, as needed, and may include, for example, voltage sensors, temperature sensors, magnetic sensors, lumens sensors, level and delta sensors. The tamper sensors may include 1 or more of any of these type of sensors, may not include a particular type of sensor, or may include other types of sensors. Secure processor 150 provides data processing operations for secure platform 152, such as, for example, local secure data processing and data transfers, as well as managing recovery operations, including emergency tasks and non-emergency tasks. In one embodiment, host platform 154 also includes an external security event management circuit which manages the transfer of data from secure platform 152 to an external network and vice versa during tamper events.

It is important in system 100 that the data stored within secure platform 152 remain intact, and in some cases, secret as well. Therefore, harmful events or phenomena that threaten the integrity and secrecy of the data with secure platform 152 need to be detected and addressed, in order to maintain the data integrity and secrecy. In operation, the tamper sensors of secure platform 152 detect various types of threat characteristics from various places on system 100. For example, one threat sensor may detect voltage level drops in SRAM 134 and another sensor may be detecting magnetic fields near MRAM 136. Voltage drops (resulting in low power operation) does not threaten data stored in MRAM 136 but may threaten any data stored in SRAM 134.

Similarly, high magnetic fields do not threaten data stored in SRAM 134 but may threaten any data stored in MRAM 136. Other tamper sensors include optical sensors, thermal sensors, clock skew sensors, or any other sensor of a characteristic that affects one or more memory devices of system 100.

In response to signals from tamper sensors of secure platform 152, a corresponding threat detection circuit provides a multi-level threat indicator as well as a tamper source indicator to threat handling circuit 118. The multi-level threat indicator can indicate no threat, imminent threat, inevitable threat, or catastrophic threat, in which an inevitable threat is a more severe threat than an imminent threat, and a catastrophic threat is a more severe threat than an inevitable threat. The tamper source can indicate the SRAM, MRAM, or an external source. Different values of these indicators correspond to different threat conditions. For example, for the threat sensor detecting voltage drops in SRAM 134, the corresponding threat detection circuit may indicate, at any point in time based on the voltage threat sensor, whether a particular drop in voltage is no threat to the data stored in the SRAM, imminent threat to this data, inevitable threat to this data, or is a catastrophic threat to this data. Similarly, for the threat sensor detecting magnetic fields near MRAM 136, the corresponding threat detection circuit may indicate whether the existence of the magnetic field threat is no threat to data stored in the MRAM, imminent threat to this data, inevitable threat to this data, or is a catastrophic threat to this data. Based on the threat conditions determined by the tamper sensors and the threat level detection circuits, different safety and recovery operations may be performed, as will be described in more detail below.

Figure 2:
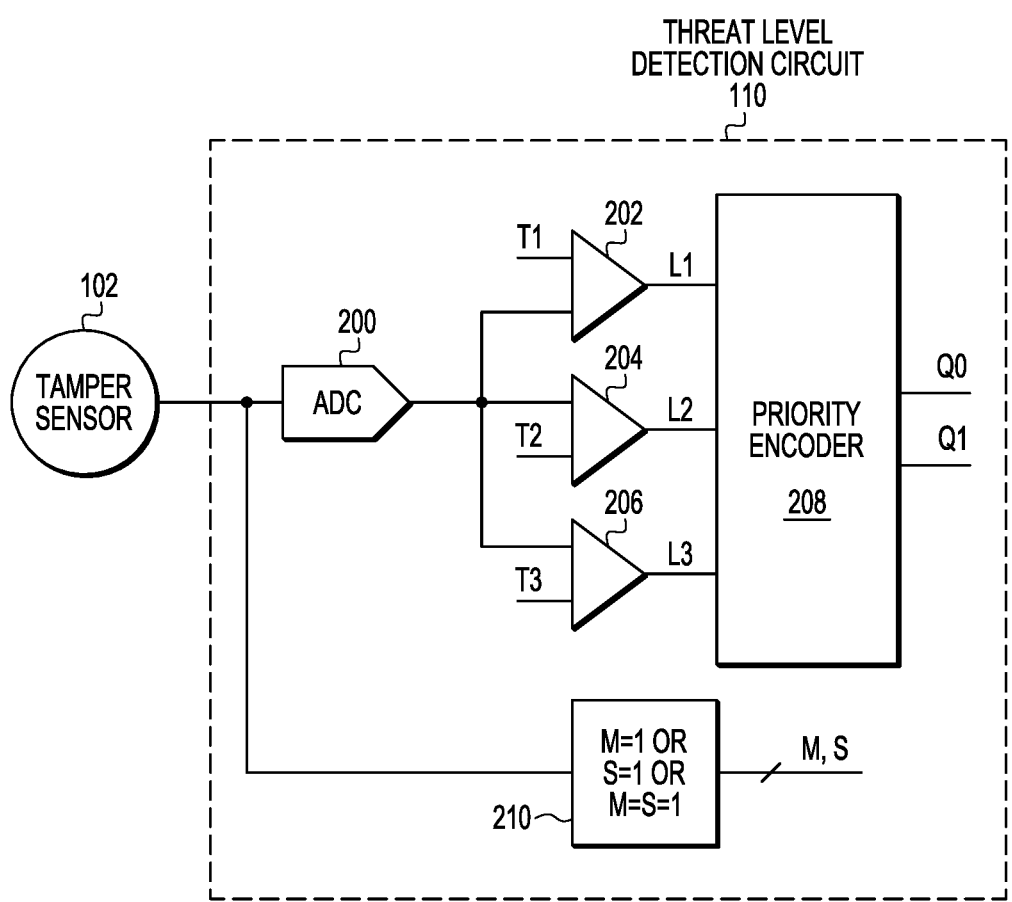
FIG. 2 illustrates, in partial schematic and partial block diagram form, a threat level detection circuit of the secure platform of FIG. 1, in accordance with one embodiment of the present invention.

FIG. 2 illustrates, in partial block diagram and partial schematic form, further details of threat level detection circuit 110. However, note that the descriptions provided for threat level detection circuit 110 apply to all threat level detection circuits of system 100, including circuits 112, 114, and 116. Tamper sensor 102 provides an indicator output to threat level detection circuit 110. For example, if tamper sensor 102 is a voltage sensor, a voltage indicator, indicative of a voltage level, is provided to threat level detection circuit 110, and if tamper sensor 102 is a magnetic field sensor, a magnetic field indicator, indicative of a magnetic field level, is provided to threat level detection circuit 110. Threat level detection circuit 110 includes an analog-to-digital converter (ADC) 100, which is coupled to receive the indicator from tamper sensor 102 and convert the analog value to a digital value. The output of ADC 200 provides a digital representation of the sensor output, such as, for example, a digital representation of a voltage or magnetic field. Threat level detection circuit 110 includes a plurality of comparators. In the illustrated embodiment, threat level detection circuit 110 includes three comparators. A first comparator 202 compares the digital representation of the sensor output to a first threshold, T1, and provides the output as L1 to a priority encoder 208. A second comparator 204 compares the digital representation of the sensor output to a second threshold, T1, and provides the output as L2 to priority encoder 208. A third comparator 206 compares the digital representation of the sensor output to a second threshold, T3, and provides the output as L3 to priority encoder 208.

Depending on the type of threat being detected by sensors 102, comparators 202, 204, and 206 may determine if the digital representation of the sensor output is greater than or less than each of the corresponding thresholds, and the thresholds can be set accordingly. For example, in case of a voltage sensor, T1>T2>T3, wherein each comparator determines when the measured voltage level is less than its corresponding threshold. In this manner, as the voltage first starts to drop, L1 will be asserted first (to a logic level 1), while L2 and L3 remain negated (a logic level 0). As the voltage continues to drop, L1 will next be asserted, followed by L3 as the voltage continues to drop further. As another example, in the case of a magnetic field sensor, T1<T2<T3, wherein each comparator determines when the measured magnetic field exposure is greater than its corresponding thresholds. In this manner, as the magnetic field exposure first starts to rise, L1 will be asserted first (to a logic level 1), while L2 and L3 remain negated (a logic level 0). As the magnetic field exposure increases, L2 will be asserted, followed by L3 as the magnetic field continues to rise further.

Priority encoder 208 receives the level indicators, L1, L2, and L3, and, in response, provides a 2-bit output, Q0 and Q1 (also referred to as Q[0:1]), which provides a multi-level threat indicator. FIG. 3 illustrates a table 300 which provides the outputs Q0 and Q1 based on the values of the inputs L1, L2, and L3. When L1=L2=L3=0, then Q[0:1]=11, indicating no threat. When L1=1, but L2=L3=0, Q[0:1]=10, indicating an imminent threat. When L2=1 and L3=0, Q[0:1]=01, indicating an inevitable threat, which is a greater or more severe threat than an imminent threat. Note that for this case, L1 is a "don't care" value. When L3=1, Q[0:1]=11, indicating a catastrophic threat, which is a greater or more severe threat than an inevitable threat. In this case, L2 and L1 are "don't care" values.

In addition to threat level indicators Q0 and Q1, threat level detection circuit 110 also provides tamper source indicators M and S. M is asserted if the tamper source is MRAM and S asserted if the tamper source is SRAM. For example, magnetic fields are a problem for MRAMs, so if tamper sensor 102 is a magnetic field sensor, the corresponding tamper source would be provided as M=1 and S=0. In another example, low voltages (and thus low power) may be a problem for SRAMs, so if tamper sensor 102 is a voltage detector for SRAM 134, then S=1 and M=0. If, for example, a tamper sensor, such as a temperature sensor, senses a condition that affects both SRAM and MRAM, the S=1 and M=1. In the case of a system tamper detected, for example, by system threat detector 120, the threat does not specifically apply to SRAM or MRAM, and thus M=S=0 for external or system threats. However, even with external or system threats, Q0 and Q1 still provides a corresponding threat level. In one embodiment, threats detected by system threat detector 120 includes, e.g., malicious software or network behavior that may attempt to access the system secrets or critical functions without authorization, or corrupt its operation.

Each of the threat level detection circuits (corresponding to each of sensors 1-N) provides a corresponding Q0, Q1, M, and S. For each threat level detection circuit, the combination of values for Q0,Q1, M, and S provides a particular threat condition, which has a corresponding state ID and indicates a corresponding tamper situation occurring in system 100, as illustrated in table 400 of FIG. 4. Each tamper situation has its own corresponding response to protect memory devices of secure platform 152 and its own recovery sequence upon the tamper threat subsiding. This will be discussed in further detail with respect to FIGS. 6 and 7 below.

Referring to FIG. 4, the first row of table 400 indicates a threat condition in which Q[0:1]=00. This corresponds to state A and indicates a tamper situation of no tamper. M and S are don't cares under this threat condition. The second row of table 400 indicates a threat condition in which Q[0:1]=01 and M=S=0. This corresponds to state B and indicates a tamper situation of an imminent system tamper (from an eternal tamper source, such as system threat detector 120 as opposed to one of sensors 1-N). The third row of table 400 indicates a threat condition in which Q[0:1]=01 and M=0 and S=1. This corresponds to state C and indicates a tamper situation of an imminent SRAM tamper. The fourth row of table 400 indicates a threat condition in which Q[0:1]=01 and M=1 and S=0. This corresponds to state D and indicates a tamper situation of imminent MRAM tamper. The fifth row of table 400 indicates a threat condition in which Q[0:1]=01 and M=S=1. This corresponds to state E and indicates a tamper situation of an imminent tamper of both the SRAM and MRAM. Note that each of states B-E correspond to imminent tamper situations, since Q[0:1]=01.

The sixth row of table 400 indicates a threat condition in which Q[0:1]=10 and M=S=0. This corresponds to state F and indicates a tamper situation of an inevitable system tamper (from an external source). The seventh row of table 400 indicates a threat condition in which Q[0:1]=10 and M=0 and S=1. This corresponds to state G and indicates a tamper situation of an inevitable SRAM tamper. The eighth row of table 400 indicates a threat condition in which Q[0:1]=10 and M=1 and S=0. This corresponds to state H and indicates a tamper situation of an inevitable MRAM tamper. The ninth row of table 400 indicates a threat condition in which Q[0:1]=10 and M=S=1. This corresponds to state I and indicates a tamper situation of an inevitable tamper of both the SRAM and MRAM. Note that each of states F-I correspond to inevitable tamper situations, since Q[0:1]=10.

The tenth row of table 400 indicates a threat condition in which Q[0:1]=11 and M=S=0. This corresponds to state J and indicates a tamper situation of a catastrophic system tamper (from an external source). The eleventh row of table 400 indicates a threat condition in which Q[0:1]=11 and M=0 and S=1. This corresponds to state K and indicates a tamper situation of a catastrophic SRAM tamper. The twelfth row of table 400 indicates a threat condition in which Q[0:1]=11 and M=1 and S=0. This corresponds to state L and indicates a tamper situation of a catastrophic MRAM tamper. The thirteenth row of table 400 indicates a threat condition in which Q[0:1]=11 and M=S=1. This corresponds to state M and indicates a tamper situation of a catastrophic tamper of both the SRAM and MRAM. Note that each of states J-M correspond to catastrophic tamper situations, since Q[0:1]=11.

Note that in alternate embodiments, the threat level detection circuits may detect more than 4 levels of threat. In this embodiment, for example, a threat level detection circuit may include more than 3 comparators. Also, the multi-level threat indicator may include more than 2 bits, as needed. In alternate embodiments, there may also be more tamper sources which threaten more than just one MRAM or one SRAM (or both). For example, there could be multiple instances of a particular memory type, or a multitude of memory types (beyond SRAM and MRAM), each type with its own distinct vulnerability, and therefore "threat" profile. Therefore, with additional threat conditions, table 400 would be expanded to include more states than just A-M. Therefore, there could be any number of states depending on the number of combinations available for the multi-level threat indicators and tamper source indicators.

Figure 5:
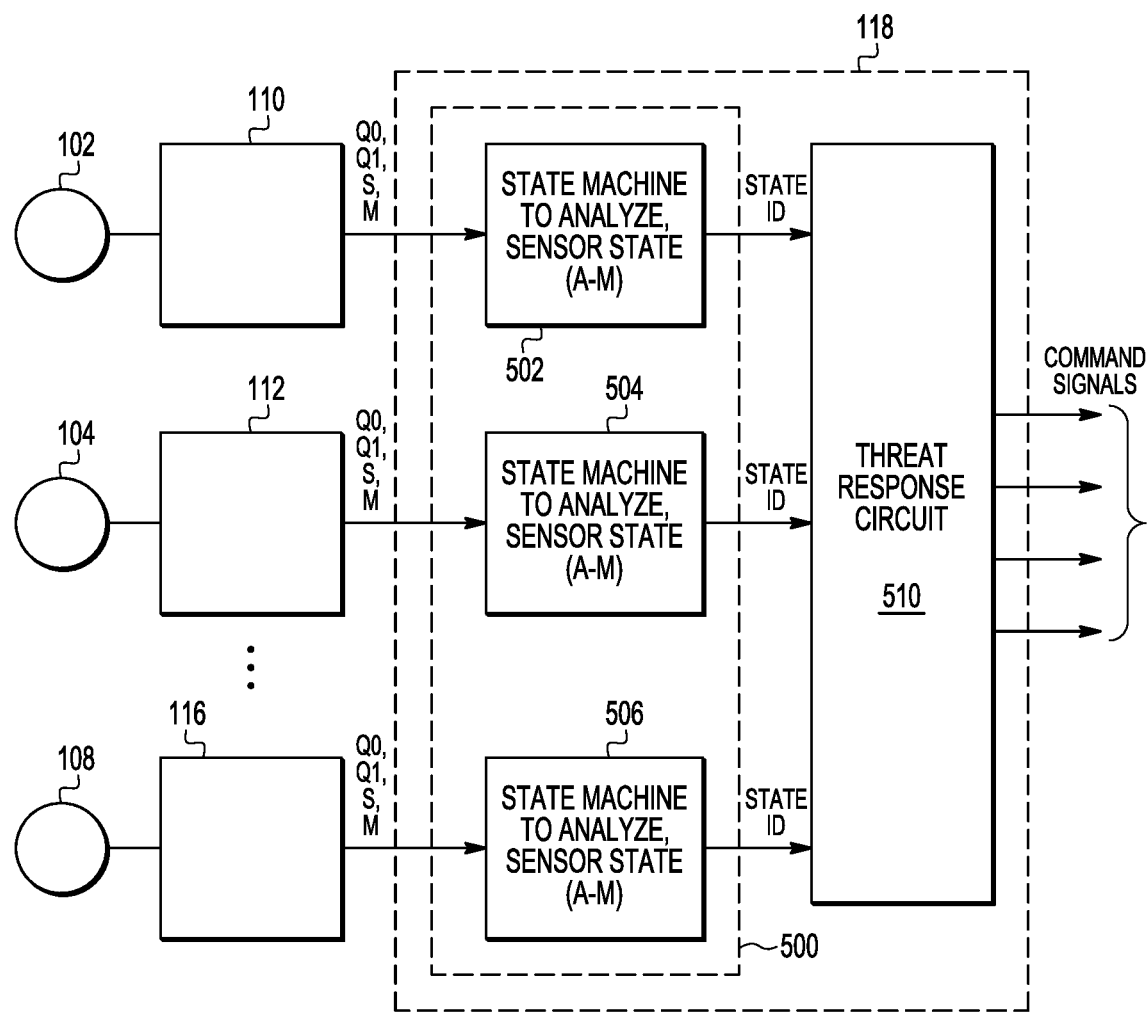
FIG. 5 illustrates, in block diagram form, tamper sensors and threat level detection circuits of FIG. 1 with further details of the threat handling circuit of FIG. 1, in accordance with one embodiment of the present invention.

FIG. 5 illustrates, in block diagram form, one embodiment of threat handling circuit 118 including state machine circuitry 500 and threat response circuit 510. A corresponding state machine circuit in state machine circuitry 500 is coupled to each threat level detection circuit and provides the state ID of the current state at its output to a threat response circuit 510. Based on the state ID from each state machine, threat response circuit sends command signals to various portions of secure platform 156 to recover from a particular threat situation. State machine circuit 502 is coupled to receive Q[0:1], M, and S from threat level detection circuit 110, which is coupled to sensor 102. State machine circuit 504 is coupled to receive Q[0:1], M, and S from threat level detection circuit 112, which is coupled to sensor 104. State machine circuit 506 is coupled to receive Q[0:1], M, and S from threat level detection circuit 116, which is coupled to sensor 108. Each of the state machines can implement the states illustrated in table 400 of FIG. 4, and each state machine can provide its current state ID to threat response circuit 510. In one embodiment, each state machine can be implemented with logic circuitry or other processing circuitry in response to the input Q, S, and M signals.

As will be discussed further below, each state also identifies required actions. Therefore, in response to each state ID (which can be more state IDs than those illustrated in FIG. 4), threat and response circuity 510 provides command signals, for example, to secure processor 150, DMA 122, OTP 140, or other elements of secure platform 152. Threat response circuit 510 is also configurable to assign priority to sensors of secure platform 152. For example, a user can designate that sensor 102 has a higher priority than sensor 106, which has a higher priority that sensor 104. In this example, threats on sensor 102 will be handled in higher preference to those of sensors 106 and 104. In this manner, priority can be ordered such that the critical data is protected as much as possible.

Note that, in an alternate embodiment, state machine circuitry 500 can be implemented as a single state machine receiving inputs from all the threat level detection circuits and providing a corresponding state ID of the larger state machine to threat response circuit 510. The resulting states of state machine circuitry 500 can also provide priority information to threat response circuitry 510. Threat response circuitry 510 can then provide its command signals in response to the state ID of this state machine circuitry.

Figure 6:
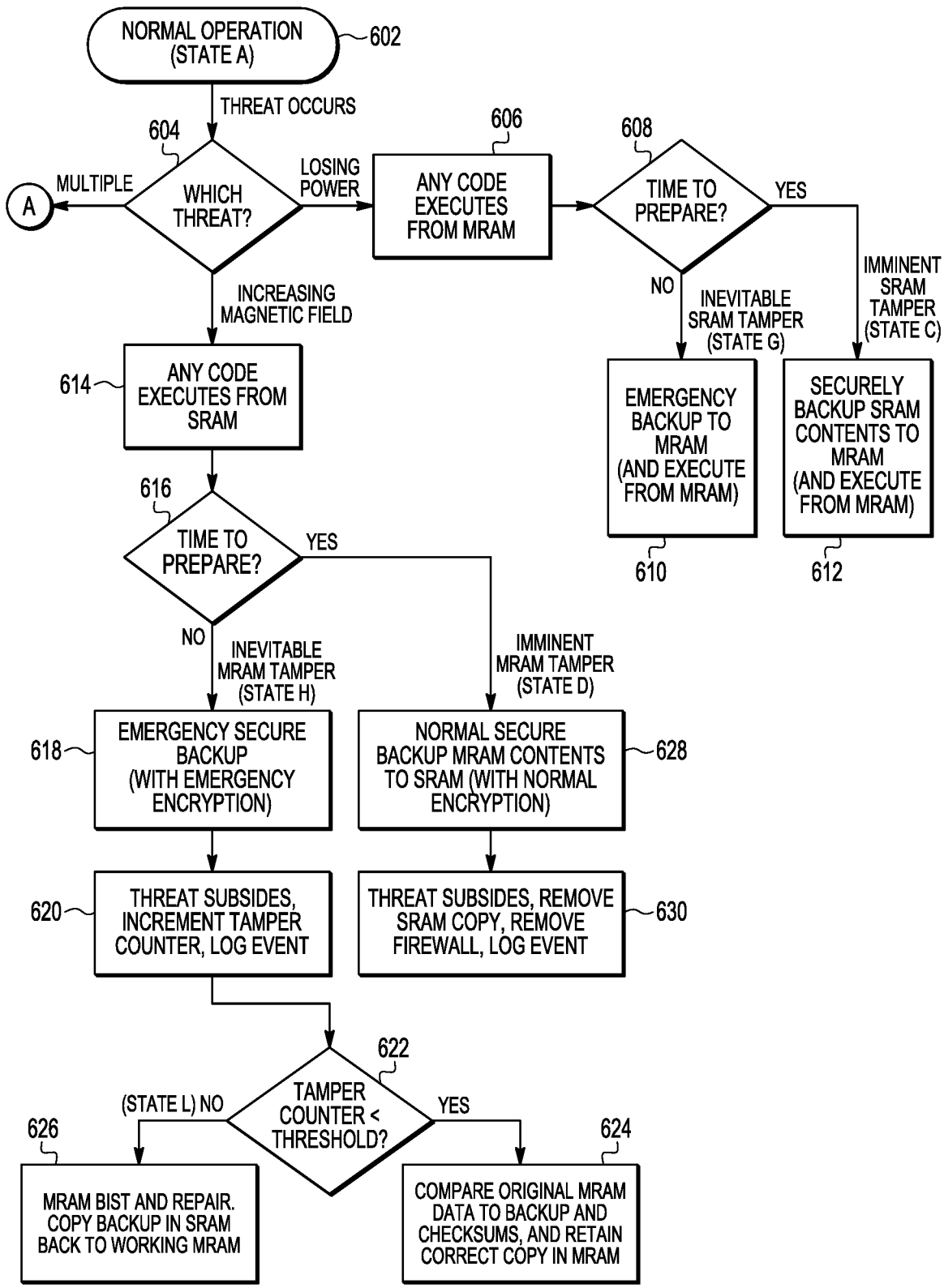
FIGS. 6 and 7 illustrate, in flow diagram form, a method of operation of the system of FIG. 1, in accordance with one embodiment of the present invention.
Figure 7:
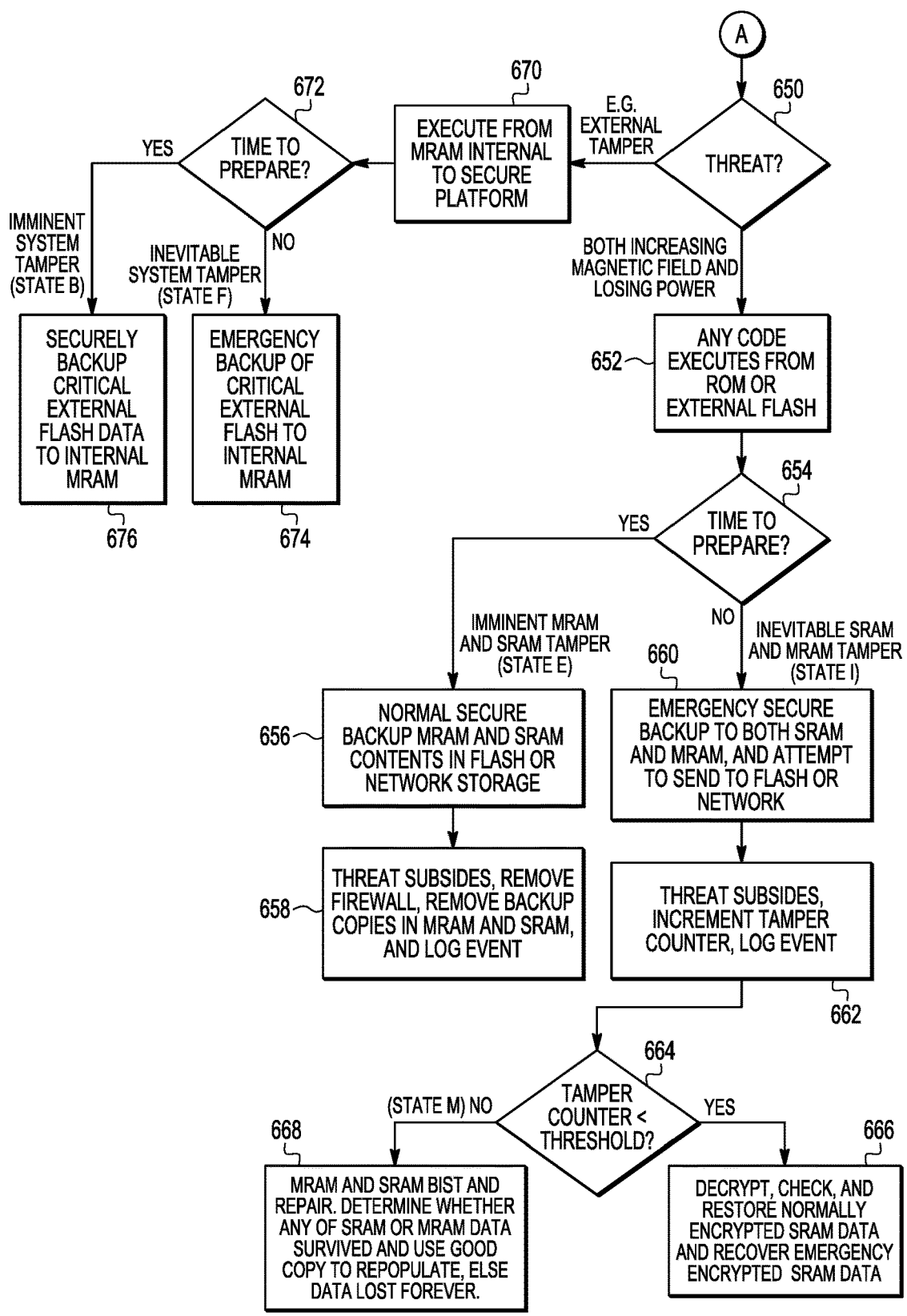

FIGS. 6 and 7 illustrate, in flow diagram form, a method 600 of operating system 100, in accordance with one embodiment of the present invention. Method 600 begins in FIG. 6 with block 602 in which system 100 is in normal operation (which corresponds to state A of table 400), in which no tamper is detected by any of the tamper sensors. While in normal operation, the control input of MUX 132 is set such that access controller 128 has access to SRAM 134. In this manner, host processor 124 operates normally, accessing SRAM 134 via access controller 128 as needed, and accessing any of the components coupled to host bus 126, as needed. During normal operation, the tamper sensors of secure platform 152, such as sensors 102, 104, 106, and 108, continuously monitor or sense characteristics of system 100, and so long as system threat detector 120 and the threat level detection circuits continue to indicate a "no threat" tamper situation, system 100 remains in normal operation (corresponding to state A). While in state A, a threat occurs (sensed by at least one of the tamper sensors of secure platform 152) and method 600 proceeds to decision diamond 604.

At decision diamond 604, it is determined which type of threat is detected. If there is an increasing magnetic field, method 600 goes to block 614 in which any code is executed from SRAM 134 and not from MRAM 136. That is, access to MRAM 136, such as by host processor 124 or secure processor 120, is prevented because the data of the MRAM is at risk due to the presence of the magnetic field. In this case, a tamper sensor associated with MRAM 136 senses an increasing magnetic field, and the corresponding threat level detection circuit provides its corresponding multi-level threat indicator (e.g. Q[0::1]) along with the corresponding source indicator (e.g. M=1 and S=0) to threat handling circuit 118. After block 614, based on the received multi-level threat indicator and tamper source indicator, the appropriate threat condition is known (in accordance with table 400). Therefore, at decision diamond 616, it is determined, based on the threat condition, whether there is time to prepare protection against data loss (i.e. whether the threat condition in imminent or inevitable). If the threat condition is an imminent MRAM tamper (corresponding to state D), method 600 proceeds to block 628, and if the threat condition is an inevitable MRAM tamper (corresponding to state H), method 600 proceeds to block 618.

Referring first to the imminent MRAM tamper situation, there is more time available to prepare against data loss as compared to an inevitable MRAM tamper situation. Therefore, after decision diamond 616, method 600 proceeds to block 628 in which a normal secure backup of the contents of MRAM 136 to SRAM 134 is performed. For example, in response to the imminent MRAM tamper situation (corresponding to state D), threat handling circuit 518 changes the control input of MUX 132 such that internal bus 130 can access SRAM 134, and provides control signals to DMA 122 to direct DMA 122, via its output command signals, to transfer the contents of MRAM 126 to SRAM 134. In doing so, the encryption engine of DMA 122 can perform normal encryption (which takes more time than emergency encryption, as was described above). Also, in another embodiment, with sufficient time, threat handling circuit 118 can instead direct secure processor 150 to perform the data transfer from MRAM to SRAM. When the imminent MRAM tamper threat subsides, in block 630, the SRAM copy is removed and the firewall for MRAM 136 is removed such that access to MRAM 134 is restored. That is, the control input of MUX 132 is set so that access controller 128 can again access MRAM 134. Also, the tamper event is logged, such as in OTP 140.

Referring now to the inevitable MRAM tamper situation, there is less time available to prepare against data loss as compared to the imminent MRAM tamper situation. Therefore, after decision diamond 616, method 600 proceed to block 618 in which an emergency backup of the contents of MRAM 136 to SRAM is performed. Again, MUX 132 allows internal bus 130 to access SRAM 134 and threat handling circuit 118 can direct DMA 122, via its output command signals, to transfer the contents of MRAM 126 to SRAM 134. In this case, the encryption engine of DMA 122 can perform emergency encryption which is faster but appropriate for only one use. It is also unlikely that secure processor 150 is used to transfer the contents because that would typically be slower than DMA 122. When the inevitable MRAM tamper subsides, in block 620, tamper counter 156 in OTP 140 is incremented and the tamper event is also logged, such as in OTP 140.

The count value of tamper counter 156 is compared with a tamper threshold, which indicates a threshold for "too many" occurrences of inevitable tamper conditions. (In one embodiment, tamper counter 156 is specific to counting inevitable tamper conditions on the MRAM, but alternately, it can count inevitable tamper conditions, regardless of which memory device the inevitable tamper condition is affecting.) At decision diamond 622, if the count value of tamper counter 156 is not below the tamper threshold, a built-in self-test of the MRAM is performed with repair. This includes restoring the contents of MRAM 136 by copying the backup in SRAM back to the working MRAM. If, at decision diamond 122, the count value is still below the tamper threshold, the original MRAM data and checksums are compared to the backup data in the SRAM, and then the correct copy is retained in MRAM 136.

Referring back to decision diamond 604, if the threat condition relates to losing power (such as a drop in voltage), then the data in SRAM 134 is at risk. In this case, at block 606, SRAM 134 is firewalled and any code is executed from MRAM 136 and not SRAM 134. At decision diamond 608, it is determined how much time there is to prepare protection against data loss, based on the threat condition. If the threat condition is an imminent SRAM tamper condition (corresponding to state C), method 600 proceeds to block 612, and if the threat condition is an inevitable SRAM tamper (corresponding to state G), method 600 proceeds to block 610.

Referring to block 612, upon an imminent SRAM tamper condition, host access to SRAM 134 is denied, and the contents of SRAM 134 are securely backed up to MRAM 136 using normal encryption, such as by DMA 122. Executions from SRAM 134, such as by secure processor 150, are prevented. Execution continues from MRAM 136. When this threat subsides, an integrity check of the SRAM contents is performed, and the SRAM firewall is removed. The MRAM backup copy is removed and the tamper event may be logged, such as in OTP 140.

Referring to block 610, upon an inevitable SRAM tamper condition, an emergency backup from SRAM 134 to MRAM 136 is performed using emergency encryption, such as by DAM 122. Executions continue from MRAM 136. When this threat subsides, based on how many threat conditions have occurred, the original copy in the SRAM is recovered, or what was backed up in MRAM is coped back to the working SRAM.

Referring back to decision diamond 604, if multiple threats are sensed, method 600 proceeds, through point A, to decision diamond 650 of FIG. 7. If a voltage sensor tamper sensor and a magnetic field sensor both result in their corresponding threat level detection circuits indicating a threat condition (corresponding to both an increasing magnetic field threat and a power loss threat), both MRAM 136 and SRAM 134 are at risk for data loss. In this case, method 600 proceeds from decision diamond 650 to block 652 in which any code now executes from ROM 138 or from an external memory, such as an external flash, which may be coupled to external memory connector 148. In this case, the contents of neither the SRAM nor MRAM can be trusted, and therefore, code should not be executed from SRAM 134 or MRAM 136.

At decision diamond 654, the amount of time available to prepare for protection against data loss (i.e. whether the threat conditions are imminent or inevitable) is determined. If the threat condition indicated by the threat level detector circuits indicates an inevitable SRAM and MRAM tamper (corresponding to state I of FIG. 4), method 600 proceeds to block 660. If the threat condition indicates an imminent SRAM and MRAM tamper (corresponding to state E of FIG. 4), method 600 proceeds to block 656.

Referring first to the imminent SRAM and MRAM tamper situation, there is more time available to prepare against data loss as compared to an inevitable MRAM and SRAM tamper situation. In this situation, there is no safe storage internal to secure platform 152, therefore MRAM 134 and SRAM 136 are firewalled to prevent access to them. After decision diamond 654, method 600 proceeds to block 656 in which a normal secure backup of the contents of MRAM 136 and SRAM 134 to a flash memory or network storage is performed. In this case, the normal backup to the external memory or network storage may be performed by secure processor 150. Also, backups of MRAM 136 and SRAM 134 may be swapped, for redundancy, since it is unknown which memory will fail or how. This may be performed by DMA 122 with normal encryption or by secure processor 150. At block 658, when this imminent threat subsides, the firewalls of MRAM 136 and SRAM 134 are removed such that they again be accessed. The tamper event is logged, and, in this case, it can be logged in MRAM 134. Note that tamper counter in OTP 140 is not incremented (since the threat is imminent and not inevitable). That is, in one embodiment, the OTP counter is considered a limited resource and is only incremented in the case that both MRAM 136 and SRAM 134 are expected to enter a catastrophic state (and thus incremented in the preceding inevitable state and not in the imminent state). Also, the backup copies in SRAM 134 and MRAM 136 are removed.

Referring now to the inevitable SRAM and MRAM tamper situation, corresponding to state I, internal storage (both SRAM 134 and MRAM 136) will likely fail. An attempt can be made to send the contents of the internal storage to an external memory (e.g. flash) or network memory with emergency encryption. Also, backups of MRAM 136 and SRAM 134 may also be swapped, for redundancy. If there is not enough time and power for an external data move to an external memory or network memory, a beacon alert can be provided, such as by threat handling circuit 118. During the inevitable threat state, in block 662, tamper counter 156 in OTP 140 is incremented and the tamper event is also logged, such as in OTP 140.

The count value of tamper counter 156 is compared to the tamper threshold in decision diamond 664. If the counter value is less than the threshold, then, at block 666, the normally encrypted SRAM data is decrypted, checked, and restored, and the emergency encrypted SRAM data is recovered. If the count value is still below the threshold, SRAM and MRAM BIST with repair is performed at block 668. This includes determining whether any of the SRAM or MRAM data survived, and using a good copy of the data to repopulate the SRAM or MRAM or both. However, if no good copy exists, the data is lost forever.

Note that in one embodiment, tamper events are logged whether the tamper situation is imminent or inevitable. However, in alternate embodiments, tamper events may only be logged in response to inevitable tamper threats and not for imminent tamper threats. In this example, the tamper events would not be logged in blocks 630 and 658. The tamper counter can also be incremented only with inevitable tamper situations (as in the embodiments described above) or with both inevitable and imminent tamper situations. Alternatively, there may be multiple counters, not only for different memory devices but for different threat levels of threat situations. Also, in the examples provided above, in blocks 618 and 628, upon transferring the contents of the MRAM to the SRAM, the contents of the MRAM can be removed or erased. This ensures no access to the MRAM data is possible, as the imminent or inevitable tamper situation is occurring. Upon any threat subsiding, the responses and recovery actions can be directed by threat handling circuit 118 and performed by secure processor 150 or by DMA 122, as appropriate.

Referring back to decision diamond 650, if the threat is an external threat, such as from external threat detector 120, method 600 proceeds to block 670 in which code is now executed from MRAM 136, which is internal to secure platform 152. At decision diamond 672, it is determined, based on the tamper situation (imminent system tamper or inevitable system tamper), how much time there is to prepare against data loss. In the case of an imminent system tamper situation (corresponding to state B of FIG. 4), method 600 proceeds to block 676 in which the critical external flash data is securely backed up to internal MRAM 136. In this case, normal encryption can be performed. Also, in this case, host platform 154 is questionable, therefore, secure platform 152 is prepared for lock down in which access from system 100 are slowed down and logging of system transactions is increased. In the case of an inevitable tamper situation (corresponding to state F of FIG. 4), method 600 proceeds to block 674 in which an emergency backup of the critical external flash data is copied to internal MRAM 136. In this case, emergency encryption may be performed. Also, in this case, host platform 154 is about to fail, therefore, SRAM 134 is locked from access by host platform 154. All the data in secure platform is emergency encrypted and any non-encrypted data is erased.

In the flow diagrams of FIGS. 6-7, each of states A-M of FIG. 4 appear, along with possible recovery actions upon the threat subsiding. Any threat described above, though, can proceed to the catastrophic state. For example, state J of FIG. 4 corresponds to a catastrophic system tamper which would follow after the inevitable system tamper in state F. In this state, host platform 154 has failed and accesses by the host platform are firewalled. An emergency signal may be provided, and external hardware can provide an indication of system failure external to system 100. State K of FIG. 4 corresponds to a catastrophic SRAM tamper which would follow after the inevitable SRAM tamper in state G. In this state, the SRAM is firewalled. If the threat subsides, then SRAM BIST and repair can be performed in which what was backed up in MRAM is copied back to the working SRAM. State L of FIG. 4 corresponds to a catastrophic MRAM tamper which would follow after the inevitable MRAM tamper in state H. In this state, the MRAM is firewalled. If the thread subsides, then MRAM BIST and repair can be performed in which what was backed up in SRAM is copied back to the working MRAM. State M of FIG. 4 corresponds to a catastrophic SRAM and MRAM tamper which would follow after the inevitable SRAM and MRAM tamper in state I. In this state, execution is forced to the ROM and copies of data are retained in both the MRAM and SRAM which are firewalled from external access or local execution. If there is enough spare memory then multiple copies may be stored in each RAM. A signal can also be sent to indicate the failure.

If the threat subsides, then the copies of data stored in SRAM and MRAM are checked for errors to determine whether any of the SRAM or MRAM data survived. At locations where data was found to be corrupt, memory BIST can be performed to determine if the offending memory cells are permanently damaged. If physical damage is sustained, a repair procedure replaces the broken cell or cells with backup memory cells by modifying the cell memory addressing. This cell address modification is stored in OTP and used from then on. If none of the backup copies survived the attack on all memories, then the data may be lost. In any of these catastrophic states, the catastrophic tamper event may be logged in robust OTP. Also, if in any of these catastrophic states, the system is fully recoverable, then the attack counters are effectively reset, meaning for OTP which are not erasable, the old counter value is made invalid and a new counter is started in new bit locations in the OTP.

Therefore, by now it can be understood how, in response to multi-level threat indicators and tamper source indicators, generated within a secure platform, a threat handling circuit can handle the threat so as to save and preserve the availability, integrity, and secrecy of the information stored within the secure platform. Each multi-level threat is generated in response to a tamper sensor located on the SoC, and the multi-level threat indicator along with the tamper source indicator define a threat condition which indicates a particular tamper situation. The threat handling circuit, in response to each temper situation, can direct appropriate responses to safeguard the contents of the memory devices within the secure platform, such as an MRAM and SRAM. The threat handling circuit can, for example, direct a DMA to transfer data, with normal or emergency encryption, or can direct a secure processor within the secure platform to transfer data or perform other tasks and responses.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 100 are circuitry located on a single integrated circuit or within a same device. Other integrated circuits may be connected to system 100, such as via external memory connector 148 or as external peripherals connected to host bus 126. Therefore, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Also, with respect to the state machines described herein, there may be fewer or additional states, as needed, and may be implemented with a variety of different hardware structures, such as, for example, programmable logic arrays, logic circuits, etc.

Although the invention is described herein with reference to specific embodiments, various modifications and changes can be made without departing from the scope of the present invention as set forth in the claims below. For example, secure platform 152 may include additional memory devices, such as multiple MRAMs or SRAMs. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data system includes an information bus; a volatile memory located on the information bus; a Magnetic Random Access Memory (MRAM) located on the information bus; a threat handling circuit, wherein in response to a first threat condition, the threat handling circuit initiates a transfer of data via the information bus from the MRAM to the volatile memory for storage during a threat to the MRAM as indicated by the first threat condition. In one aspect, the threat is characterized by a magnetic field exposure. In another aspect, the data system further includes a Direct Memory Access (DMA), wherein in response to a first threat condition, the threat handling circuit initiates the DMA to transfer the data via the information bus from the MRAM to the volatile memory for storage during the threat to the MRAM. In another aspect, the data system further includes a processor located on the information bus, wherein in response to the first threat condition, the threat handling circuit initiates the processor to transfer the data via the information bus from the MRAM to the volatile memory for storage during the threat to the MRAM. In another aspect, the data system further includes an encryption engine, wherein as part of the transfer of data, the encryption engine encrypts the data before storing in the volatile memory. In a further aspect, in response to the first threat condition, the data is encrypted as per a first encryption protocol, wherein in response to a second threat condition, the data is encrypted as per a second encryption protocol as part of a transfer of data via the information bus from the MRAM to the volatile memory for storage during a threat to the MRAM as indicated by the second threat condition, wherein the second threat condition is characterized as a more severe condition of the threat than the first threat condition. In yet another aspect, the data system further includes a threat level detection circuit, the threat level detection circuit providing an output indicative of a threat level of a plurality of threat levels of a threat, wherein the plurality of threat levels is greater than two. In another aspect, in response to the threat subsiding, the threat handling circuit initiates a transfer of the data via the information bus from the volatile memory to the MRAM. In another aspect, as part of the data transfer to the MRAM, the data in the volatile memory is erased. In yet another aspect, in response to a threat of a second threat condition subsiding, a threat event is logged in a memory location of the data system, wherein, in response to the threat of the first threat condition subsiding, a threat event is not logged in a memory location of the data system, wherein the second threat condition is characterized as a more severe condition of the threat than the first threat condition. In another aspect, the threat includes a magnetic field exposure and a power loss. In a further aspect, during the first threat condition, data is transferred from the volatile memory to the MRAM. In another further aspect, the data system further includes a processer, where during the threat, the processor executes from a ROM coupled to the bus.

In another embodiment, a method includes detecting a first threat condition by threat detection circuitry; wherein in response to a first threat condition, transferring data via an information bus from an Magnetic Random Access Memory (MRAM) to a volatile memory for storage during a threat to the MRAM as indicated by the first threat condition. In one aspect of the another embodiment, the threat is characterized as a magnetic field exposure. In another aspect, as part of the transferring of data, encrypting the data before storing in the volatile memory. In a further aspect, the encrypting the data includes encrypting as per a first encryption protocol, and the method further includes detecting a second threat condition; wherein in response to the second threat condition, transferring data via the information bus from the MRAM to the volatile memory for storage during a threat to the MRAM as indicated by the second threat condition, wherein as part of the transferring of data in response to the second threat condition, encrypting the data before storing in the volatile memory as per a second encryption protocol; wherein the second threat condition is characterized as a more severe condition of the threat than the first threat condition and the first encryption protocol is characterized as appropriate for multi-use whereas the second encryption protocol is characterized as a faster encryption protocol than the first encryption protocol and is characterized as appropriate for single use. In yet another aspect of the another embodiment, the detecting a first threat condition by threat detection circuitry includes detecting a threat level of a plurality of threat levels of the threat. In another aspect, in response to the threat subsiding, transferring the data via the information bus from the nonvolatile memory to the MRAM. In a further aspect, the transferring the data to the MRAM includes erasing the data in the non-volatile memory. In yet another aspect, the threat includes a magnetic field exposure and a power loss, wherein the method further includes wherein in response to the first threat condition, transferring data via an information bus from the volatile memory to the MRAM for storage during the threat.

What is claimed is:

1. A data system, comprising:
an information bus;
a volatile memory located on the information bus;
a Magnetic Random Access Memory (MRAM) located on the information bus;
a threat handling circuit, wherein in response to a first threat condition, the threat handling circuit initiates a transfer of data via the information bus from the MRAM to the volatile memory for storage during a threat to the MRAM as indicated by the first threat condition; and
an encryption engine, wherein as part of the transfer of data, the encryption engine encrypts the data before storing in the volatile memory, and wherein:
in response to the first threat condition, the data is encrypted as per a first encryption protocol,
in response to a second threat condition, the data is encrypted as per a second encryption protocol as part of a transfer of data via the information bus from the MRAM to the volatile memory for storage during a threat to the MRAM as indicated by the second threat condition, and
the second threat condition is characterized as a more severe condition of threat than the first threat condition.

2. The data system of claim 1 wherein the threat is characterized by a magnetic field exposure.

3. The data system of claim 1 further comprising a Direct Memory Access (DMA), wherein in response to a first threat condition, the threat handling circuit initiates the DMA to transfer the data via the information bus from the MRAM to the volatile memory for storage during the threat to the MRAM.

4. The data system of claim 1 further comprising a processor located on the information bus, wherein in response to the first threat condition, the threat handling circuit initiates the processor to transfer the data via the information bus from the MRAM to the volatile memory for storage during the threat to the MRAM.

5. The data system of claim 1 further comprising a threat level detection circuit, the threat level detection circuit providing an output indicative of a threat level of a plurality of threat levels of a threat, wherein the plurality of threat levels is greater than two.

6. The data system of claim 1 wherein in response to the threat subsiding, the threat handling circuit initiates a transfer of the data via the information bus from the volatile memory to the MRAM.

7. The data system of 6, wherein as part of the data transfer to the MRAM, the data in the volatile memory is erased.

8. A data system comprising:
an information bus;
a volatile memory located on the information bus;
a Magnetic Random Access Memory (MRAM) located on the information bus;
a threat handling circuit, wherein in response to a first threat condition, the threat handling circuit initiates a transfer of data via the information bus from the MRAM to the volatile memory for storage during a threat to the MRAM as indicated by the first threat condition,
wherein in response to a threat of a second threat condition subsiding, a threat event is logged in a memory location of the data system, wherein, in response to the threat of the first threat condition subsiding, a threat event is not logged in a memory location of the data system, wherein the second threat condition is characterized as a more severe condition of the threat than the first threat condition.

9. The data system of claim 8, further comprising an encryption engine, wherein as part of the transfer of data, the encryption engine encrypts the data before storing in the volatile memory.

10. The data system of claim 9 wherein in response to the first threat condition, the data is encrypted as per a first encryption protocol, wherein in response to a second threat condition, the data is encrypted as per a second encryption protocol as part of a transfer of data via the information bus from the MRAM to the volatile memory for storage during a threat to the MRAM as indicated by the second threat condition, wherein the second threat condition is characterized as a more severe condition of the threat than the first threat condition.

11. The data system of claim 1 wherein the threat includes a magnetic field exposure and a power loss.

12. The data system of claim 11 wherein during the first threat condition, data is transferred from the volatile memory to the MRAM.

13. The data system of claim 11 further comprising a processer, where during the threat, the processor executes from a ROM coupled to the bus.

14. A method comprising:
detecting a first threat condition by threat detection circuitry;
wherein in response to a first threat condition, transferring data via an information bus from an Magnetic Random Access Memory (MRAM) to a volatile memory for storage during a threat to the MRAM as indicated by the first threat condition wherein as part of the transferring of data, encrypting the data as per a first encryption protocol before storing in the volatile memory;
detecting a second threat condition;
wherein in response to the second threat condition, transferring data via the information bus from the MRAM to the volatile memory for storage during a threat to the MRAM as indicated by the second threat condition, wherein as part of the transferring of data in response to the second threat condition, encrypting the data before storing in the volatile memory as per a second encryption protocol;

wherein the second threat condition is characterized as a more severe condition of threat than the first threat condition and the second encryption protocol is characterized as a faster encryption protocol than the first encryption protocol.

15. The method of claim 14 wherein the threat is characterized as a magnetic field exposure.

16. The method of claim 14, wherein the first encryption protocol is characterized as appropriate for multi-use and the second encryption protocol is characterized as appropriate for single use.

17. The method of claim 14, wherein the detecting a first threat condition by threat detection circuitry includes detecting a threat level of a plurality of threat levels of the threat.

18. The method of claim 14 wherein in response to the threat subsiding, transferring the data via the information bus from the nonvolatile memory to the MRAM.

19. The method of 18, wherein the transferring the data to the MRAM includes erasing the data in the non-volatile memory.

20. The method of claim 14 wherein the threat includes a magnetic field exposure and a power loss, wherein the method further includes wherein in response to the first threat condition, transferring data via an information bus from the volatile memory to the MRAM for storage during the threat.

* * * * *